United States Patent [19]
Bartz et al.

[11] Patent Number: 4,595,283
[45] Date of Patent: Jun. 17, 1986

[54] APPARATUS AND METHOD FOR ADVANCING PHOTOGRAPHIC PRINT PAPER

[75] Inventors: Stephen A. Bartz, Jordan; Wayne D. Gunderson, Brooklyn Park, both of Minn.

[73] Assignee: Lucht Engineering, Inc., Minneapolis, Minn.

[21] Appl. No.: 596,284

[22] Filed: Apr. 3, 1984

[51] Int. Cl.$^4$ .............................................. G03B 27/60
[52] U.S. Cl. ....................................... 355/73; 355/77; 271/194; 271/240
[58] Field of Search ................. 355/72, 73, 77, 91, 355/28, 29, 108, 109; 352/222; 271/194, 195, 197, 238, 240, 239

[56] References Cited

U.S. PATENT DOCUMENTS

| | | | |
|---|---|---|---|
| 2,292,521 | 8/1942 | Horn | 271/197 X |
| 2,600,469 | 6/1952 | Breuers et al. | 355/109 |
| 2,753,181 | 7/1956 | Anander | 271/196 X |
| 2,804,304 | 8/1957 | Taini | 355/108 X |
| 2,892,379 | 6/1959 | Casper | 352/222 X |
| 3,220,723 | 11/1965 | Rabinow | 271/195 |
| 3,269,627 | 8/1966 | O'Brien | 271/240 X |
| 3,379,436 | 4/1968 | Flynn et al. | 271/194 |
| 3,425,777 | 2/1969 | White | 355/28 |
| 3,468,606 | 9/1969 | Wolf et al. | 355/91 |
| 3,536,401 | 10/1970 | Mason et al. | 355/28 |
| 3,689,150 | 9/1972 | Nothmann et al. | 355/73 X |
| 3,721,375 | 3/1973 | Roberts et al. | 225/96 |
| 3,890,045 | 6/1975 | Bernstein et al. | 355/73 |
| 3,936,185 | 2/1976 | Gross | 355/73 |
| 3,966,320 | 6/1976 | Wiessner | 355/73 |
| 4,148,476 | 4/1979 | Brekell | 271/194 |
| 4,177,983 | 12/1979 | Wossler | 271/194 X |

*Primary Examiner*—L. T. Hix
*Assistant Examiner*—Brian W. Brown
*Attorney, Agent, or Firm*—Kinney & Lange

[57] ABSTRACT

An improved paper advance apparatus for advancing photographic paper in a photographic printer advances print paper held against a bottom side of a vacuum platen with the leading edge of the print paper being otherwise unsupported. The apparatus includes a paper supply, a drive roller assembly for moving the paper along a paper path to an exposure station located after the drive roller assembly. A vacuum platen is positioned after the drive roller assembly and includes a pair of spaced apart guides along the bottom side thereof defining a print paper engaging surface along the paper path. A vacuum force is supplied to the paper-engaging surface through a plurality of vacuum ports for holding the print paper against the print-engaging surface. The holding force provided by the vacuum is such that the print paper is held flatly against the print-engaging surface during advancement of the paper and during exposure at the exposure station without the leading edge of the print paper needing any further support. At the beginning of a print run the paper is advanced past the exposure station to a reference point and then is pulled back so that the leading edge of the print paper is aligned with a forward edge of the exposure station eliminating waste of a leader section of the photographic paper.

16 Claims, 4 Drawing Figures

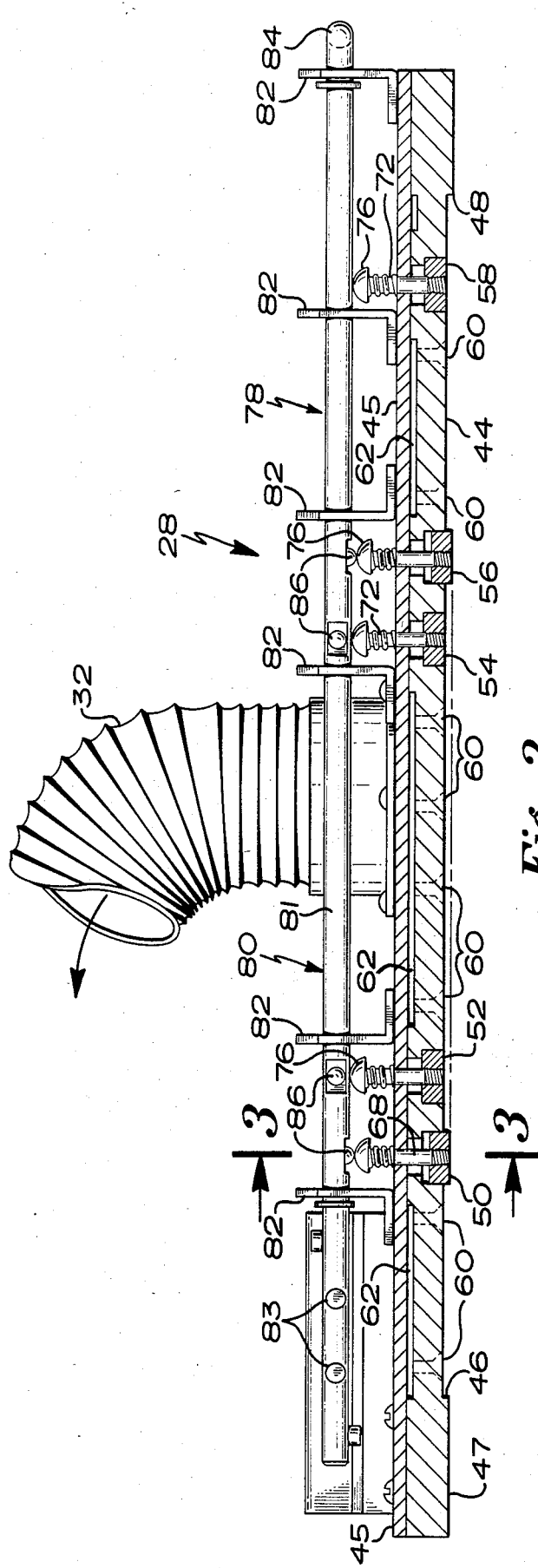
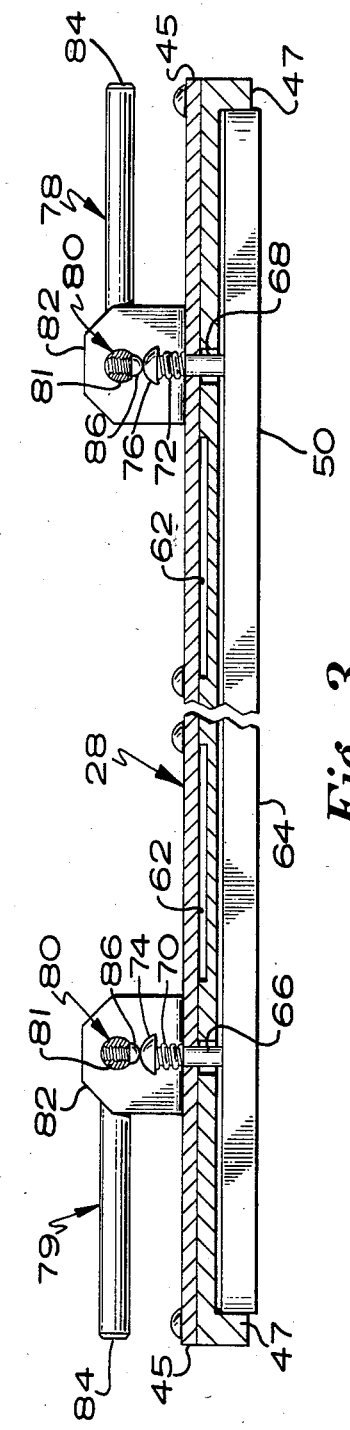

APPARATUS AND METHOD FOR ADVANCING PHOTOGRAPHIC PRINT PAPER

BACKGROUND OF THE INVENTION

1. Field of the Invention

The present invention relates to photographic printers, and in particular, it relates to the use of a vacuum platen in advancing photographic print paper.

2. Description of the Prior Art

Many photographic printers are designed and used for short run printing. Typically, these types of photographic printers are used by professional studios which use many widths of print paper, depending on the size of the prints desired by the customer.

These printers typically include an interchangeable internal print paper supply generally stored in a light-proof cannister. To produce different sizes of prints, the appropriate cannister with the proper width of print film is placed in the printer. Each time the print paper is changed, the print paper must be threaded through drive rollers which move the print paper through an exposure station. The exposure is then made on the print paper and the print paper is indexed and another exposure is made adjacent the first. This procedure is followed until the run is done and the next cannister containing a different width of photographic print paper is placed into the printer.

Generally, each run is a short run and at the beginning of each run there is a leader section of photographic print paper between the first exposure and the leading edge of the print paper that is not exposed and is cut off as waste. Due to the short runs, this wasted print paper amounts to a significant portion of the roll.

There has been much work in paper advance systems in the photographic and related industries. Some of that work has included the use of vacuum in handling either film or print paper.

For example, the Taini U.S. Pat. No. 2,804,304 describes a device that has a number of air suction slots to handle prints. The Brueuers et al U.S. Pat. No. 2,600,469 and the Anander U.S. Pat. No. 2,753,181 disclose vacuum cylinders for handling web material. The Mason et al U.S. Pat. No. 3,536,401 and the Roberts et al U.S. Pat. No. 3,721,375 show moving vacuum belts for transporting paper. In the Wolf et al U.S. Pat. No. 3,468,606 a vacuum is used to hold together two moving webs. In the Horn U.S. Pat. No. 2,292,521, the Rabinow U.S. Pat. No. 3,220,723 and the Wossler U.S. Pat. No. 4,177,983 suction devices are used to separate and lift various sheets of material. Vacuum platens are described in the Cooper U.S. Pat. No. 2,892,379, the Flynn et al U.S. Pat. No. 3,379,436, the Nothmann et al U.S. Pat. No. 3,689,150 and the Wiessner U.S. Pat. No. 3,966,320 as devices to hold film flat in cameras. Vacuum platens are also described in the Bernstein et al U.S. Pat. No. 3,890,045 and the Gross U.S. Pat. No. 3,936,185 as backing devices for holding paper and film flat in photographic printers.

SUMMARY OF THE INVENTION

The present invention includes an improvement in paper advance apparatus for advancing photographic paper in a photographic printer. The paper advance apparatus includes a paper supply and drive roller assembly for moving the paper along a paper path to and exposure station. The photographic printer includes a lens system through which an image or images is projected for exposure onto the print paper at the exposure station. The improvement includes a vacuum platen positioned after the drive roller means. The vacuum platen includes a pair of spaced-apart guides defining a print paper-engaging surface on a bottom side of the platen along the paper path. A plurality of vacuum ports are positioned on the print paper-engaging surface to retain the print paper against the surface during exposure and during advancement of the print paper. A vacuum source is connected to the platen and provides a constant vacuum force, regardless of the number of vacuum ports in engagement with the print paper, so that the print paper is held flat against the bottom surface of the platen during both exposure and advancement of the print paper without the lead edge of the print paper needing any further support.

The present invention further includes a method of advancing the print paper for eliminating waste of a leader section of paper at the beginning of an exposure run. The method includes feeding the print paper through the drive roller assembly so that a leading edge of the print paper is held against the paper-engaging surface by the vacuum. The leading edge of the print paper is advanced along the paper-engaging surface while being held against said surface by the vacuum past the exposure station to a reference point. The leading edge of the paper is then retracted to a forward edge of the exposure station thereby eliminating waste of the leader section.

BRIEF DESCRIPTION OF THE DRAWINGS

FIG. 2 is a cross-sectional view of the vacuum platen taken along the line 2—2 in FIG. 1.

FIG. 3 is a cross-sectional view of the vacuum platen showing a movable guide assembly taken along the line 3—3 in FIG. 2.

DETAILED DESCRIPTION OF THE PREFERRED EMBODIMENT

Figure 1:
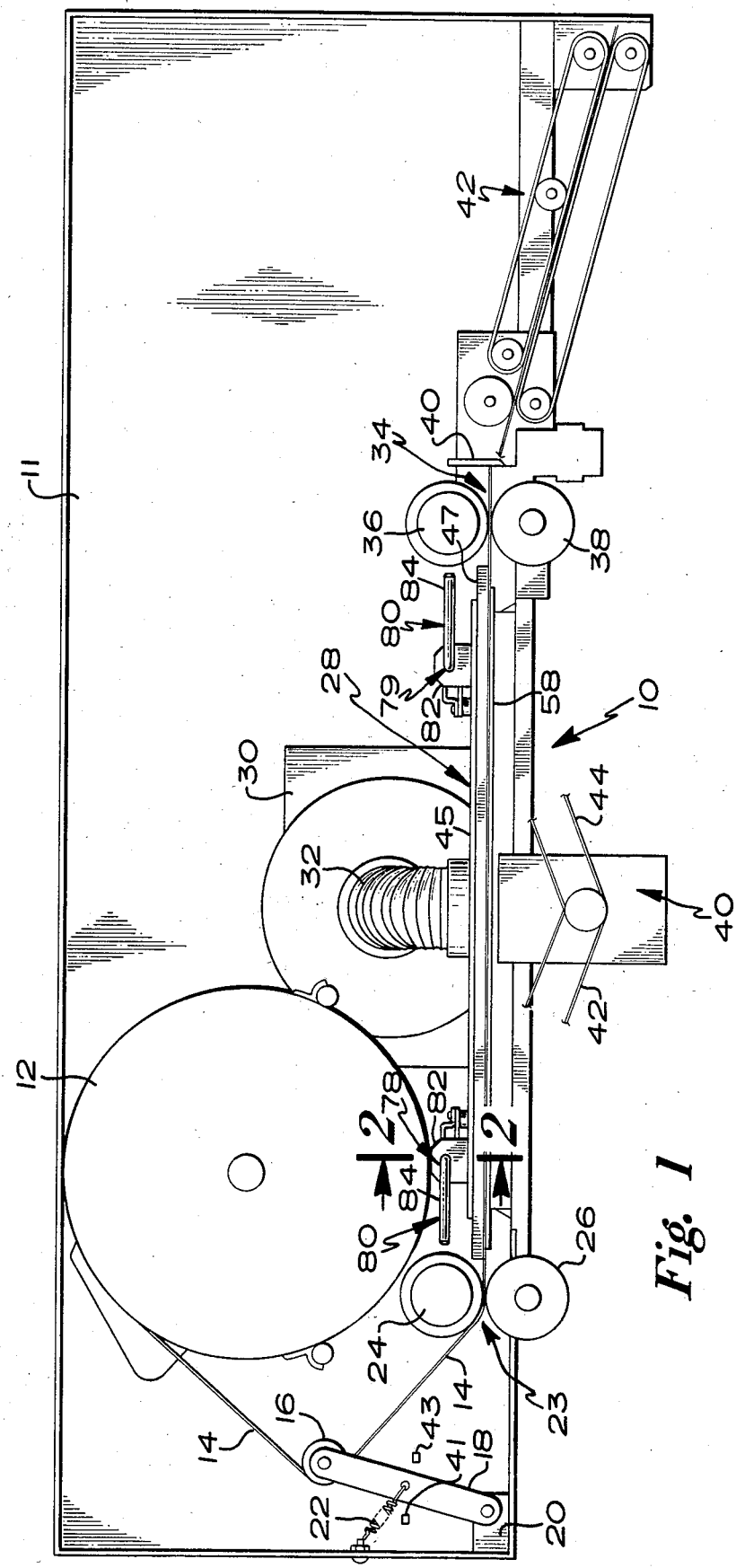
FIG. 1 is a schematic view of the improved print paper advance apparatus of the present invention.

An improved print paper advance apparatus of the present invention is generally indicated at 10 in FIG. 1. The improved print paper advance apparatus is preferably located in a photographic printer (only a portion of which is illustrated) having a lens mechanism (not shown) disposed directly below the paper advance apparatus 10. The lens mechanism is one that is commonly used in photographic printers. An image or images are projected upwardly from a negative through the lens mechanism.

Preferably, the apparatus 10 is mounted in a cabinet 11. The apparatus 10 includes a supply of photographic print paper 14 disposed within a well known type light-proof cannister 12 that is mounted within the cabinet. The print paper 14 is dispensed from the cannister 12 by a suitable stepper motor (not shown).

A pivotal tension roller 16 is rotatably mounted on a pivot arm 18 that is pivotally mounted on a support bracket 20 in the cabinet 11. The pivot arm 18 is biased away from the direction of travel of the photographic print paper 14 preferably by a spring 22 attached at one end to the pivot arm 18 and at another end to the cabinet 11. The print paper 14 is threaded around the tension roller 16 acting against the bias of the spring 22, placing the print paper 14 in tension.

A first pinch roller assembly 23 is positioned after the tension arm 16. The first pinch roller assembly 23 is of a type that is well known in the photographic art. The pinch roller assembly 23 includes a driven roller 24 and a non-driven roller 26 sufficiently close to each other so that when the print paper 14 is threaded therebetween, the rollers 24 and 26 engage the print paper sufficiently to advance it.

An improved vacuum platen, generally indicated at 28, is mounted within the cabinet 11 after the first pinch roller assembly 23. A vacuum is produced within the vacuum platen 28 by a vacuum motor represented by block 30. Suitable conduit 32 connects the vacuum motor 30 to the platen 28. The improved vacuum plate 28 and motor 30 are described in further detail subsequently.

A second pinch roller assembly 34 is mounted within the cabinet after the platen 28. The second pinch roller assembly 34 is similar to the first pinch roller assembly 23. The second pinch roller assembly 34 includes a driven roller 36 and a non-driven roller 38 sufficiently close to each other so that when the print paper 14 is threaded therebetween, the rollers 36 and 38 engage the print paper sufficiently to advance it past the platen 28.

Both pinch roller assemblies 23 and 34 are driven by a common stepper motor generally indicated at 40 through suitable gearing, including belts 42 and 44. The second pinch roller assembly 34 is driven slightly faster than first pinch roller assembly 23 so that the print paper 14 does not accumulate between the pinch roller assemblies.

A pair of microswitches 41, 43 are positioned within the cabinet 11 for engagement by the pivot arm 18 and in combination with the pivot arm 18 and the tension roller 16 control the tension of the photographic print paper. When there is too much slack in the photographic print paper, the pivot arm 18 is pulled by the spring 22 engaging the microswitch 41 and shutting off the motor (not shown) that dispenses the print paper from the cannister 12. When there is too much tension in the photographic print paper, the pivot arm 18 will be pulled by the paper 14 towards the microswitch 43, turning on the motor (not shown) for dispensing the print paper from the cannister 12.

A print paper knife assembly 40 is positioned after the pinch roller assembly 34 within the cabinet 11. The print paper knife assembly 40 cuts the print paper 42 into individual prints. The individual prints are then conveyed by a conveyor assembly 42 away from the knife assembly 40.

In FIG. 2, the improved platen 28 is illustrated in greater detail. The platen 28 preferably includes a top plate 45 and a bottom plate 47 secured to each other. The bottom plate 47 includes a bottom print paper-engaging surface 44 bordered on each side by spaced-apart inwardly facing shoulders 46 and 48 which act as guides for guiding the widest width of print paper used in the apparatus 10 and defining the print paper path along the bottom of platen 28. An exposure station is located on the surface 44 with its exact size and configuration location determined by the lens mechanism (not shown). Alternative lens configuration including single and multiple lenses are contemplated.

A plurality of movable guides 50, 52, 54, 56 and 58 are disposed within the platen 28 so that other narrower widths of print paper are accommodated by the platen 28. In one working embodiment, the shoulders 46 and 48 act as guides for 11-inch paper. For 10-inch paper, the shoulder 46 and the guide 58 are used. The guides 50 and 56 are used for 5-inch paper and the guides 52 and 54 are used for 3½-inch paper.

The movable guides 50, 52, 54, 56 and 58 are all of similar construction and are described with reference to movable guide 50 which is more fully illustrated in FIG. 3. The movable guide 50 has a lower longitudinal guide member 64 that is positioned along the longitudinal direction of the print paper path. The guide member 64 is retained within a slot in a retracted position in the bottom plate 49 by spaced-apart pins 66 and 68. The pins 66 and 68 are biased upwardly, preferably by coil springs 70, 72, respectively, disposed about the respective pins above the top plate 45. The pins 66 and 68 each have rounded heads 74 and 76 which engage the springs 70 and 72, respectively, at one end and retain the springs in a compressive state against the top plate 45.

Movable guide actuators 78 and 79 are disposed above the top plate of the platen 28 and selectively engage the guide members 50, 52, 54, 56 and 58 so that predetermined combinations of movable guides are automatically selected and positioned to guide the selected width of print paper.

Each pin 66 of the guides 50, 52, 54, 56 and 58 is positioned in a row running along the axis of the paper path for engagement by the actuator 78. Similarly, each pin 68 of the guides 50, 52, 54, 56 and 58 is positioned in a row running along the axis of the paper path for engagement by actuator 79.

Figure 4:
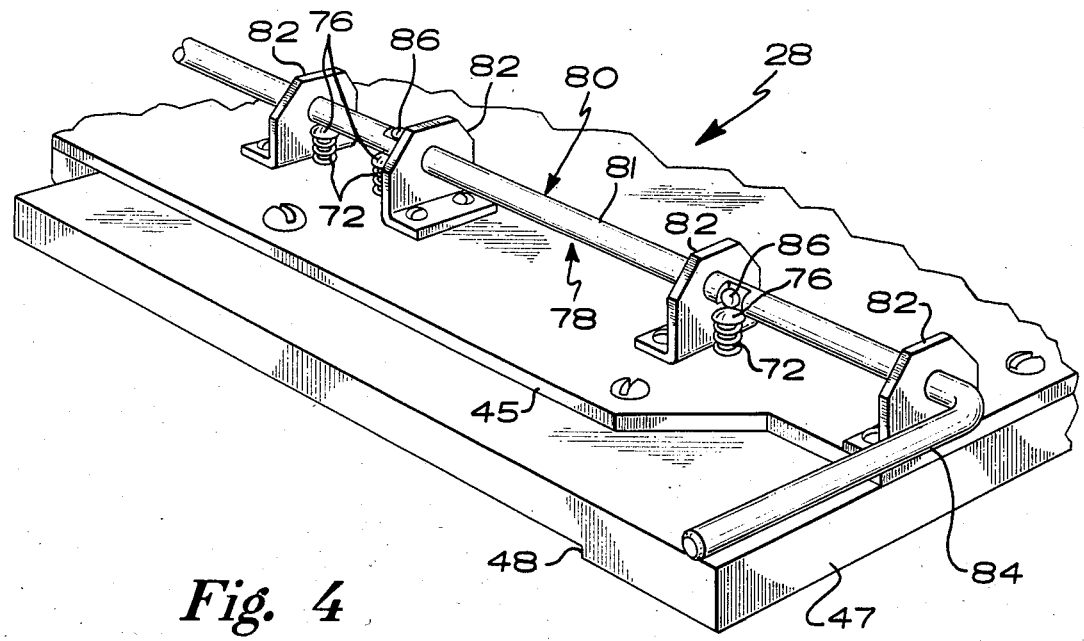
FIG. 4 is a perspective view of a guide actuator used for actuating predetermined movable guides.

Actuators 78 and 79 are mirror images of each other having like elements and will be described with reference to the actuator 78, as best illustrated in FIGS. 2 and 4. The actuator 78 includes a plurality of substantially upright brackets 82 which have a lower horizontal section that is fixedly attached to the top plate 45 of the platen 28, preferably by screws. A rod 80 has a main section 81 that rotatably extends through aligned apertures in the brackets 82 and a handle portion 84 disposed perpendicularly to the main section 81. By turning the handle portion 84, the main section 81 is rotated within the brackets 82.

The main section 81 includes a plurality of cam sections 86 for selectively engaging the predetermined heads of the pins 66 and 68 so that predetermined movable guides are moved from the retracted position to an extended position below the surface 44. In one working embodiment, the cam sections 86 include machined flat areas on the rod 80 and a round-head screw screwed into the flat area with the head extending beyond the circumference of the rod so that the screw heads are disposed to engage the heads of the pins 66 and 68. The cam sections 86 are angularly spaced around the rod in such a manner that when the rod is turned in increments of approximately 90°, the appropriate movable guide members are pushed to the extended position to accommodate the selected print paper width. The angular position of the rods may be detected in any desired manner, as through the use of elements 83 carried around the rods.

A plurality of vacuum ports 60 are disposed within the bottom plate 47 along the surface 44 so that there are vacuum ports engaging the print paper regardless of the guides that are being used. The vacuum is supplied to the vacuum ports 60 through a manifold system 62 formed by the plates 45 and 47 and connected to the vacuum blower by the conduit 32. The vacuum blower 30 is of a type that produces a relatively constant vacuum force regardless of the number of ports being blocked by the print paper that is being held against the surface 44. That is, when very few ports are covered by the print material, the vacuum blower draws sufficient air to support the leading edge of the material. However, as the material advances to cover more ports the vacuum blower draws less air. In this manner, the advance of the leading edge does not result in a significant increase in the supporting force on the paper and, accordingly, withoug a significant increase in the friction between the paper and platen. One suitable vacuum blower that produces a constant vacuum is of the same type that is used in vacuum cleaners.

As described, the vacuum force produced by the vacuum blower is sufficient to retain the paper against the surface 44 while permitting the paper to be advanced by the first pinch roller assembly 23. This is so even when different widths of print paper are used. More importantly, the vacuum retains the print paper flat against the surface 44 while the print paper is being advanced. Therefore, a leading edge of the print paper can be indexed back and forth along the surface 44 without any additional support.

The improved print paper advance system of the present invention eliminates photographic print paper waste that is now commonly encountered in short runs. Short runs are often encountered in professional studios since different widths of photographic print paper are constantly being run within the photographic printer. As previously described, the appropriate cannister is placed in the machine and the appropriate guides are used along the surface 44. The photographic print paper is threaded around the the tension roller 16 and through the first pinch roller assembly 23 with the photo-sensitive side of the paper positioned downwardly. Thereafter, the photographic print paper is advanced along the surface 44 of the platen 28 whereby the vacuum holds the leading edge of the print paper up against the surface 44 of the platen 28. The print paper edge is advanced along the surface 44 with the vacuum holding following portions of the print paper against the surface 44. Since the vacuum force does not significantly increase with an increase in the number of vacuum ports engaging the print paper, the print paper is advanced in a flat manner without folding or accumulation.

After the print paper has been advanced across the surface 44, the print paper is engaged by the second pinch roller assembly 34 and is advanced to the knife assembly 40. A small amount of the print paper is cut. The knife 40 is used as a reference point that is documented in a suitable microprocessor (not shown) commonly found in photographic printers. The pinch roller assemblies are then actuated to turn in an opposite direction retracting the print paper so that the edge of the print paper is positioned at the leading most edge of the exposure station.

It will be appreciated that in prior art photographic printers, the print paper was not retracted back and the leader portion between the leading edge of the exposure station and the knife was wasted whenever a new width of print paper was run in the printer. The amount of print paper wasted is significant when print paper supplies are changed on a regular basis or when the printer is periodically started and stopped, for any reason. The print paper advance apparatus of the present invention provides for a method and manner of retracting the print paper and holding the leading edge in such a manner so that the proper exposure can be made on the print paper without wasting the leader section of the paper. It should also be understood that other reference points besides the knife assembly 40 can be used. For example, a photocell located proximate the second pinch roller assembly 34 can be used as a reference point to enable the machine to retract the print paper to the proper location at the exposure station.

Although the present invention has been described with reference to preferred embodiments, workers skilled in the art will recognize that changes may be made in form and detail without departing from the spirit and scope of the invention.

What is claimed is:

1. An improvement in a paper advance apparatus for use with a photographic printer for advancing photographic paper in said printer, the apparatus including a paper supply, pinch roller means for moving the paper along a paper path including an exposure station and reference means for referencing a leading edge of the photographic print paper, the improvement wherein said pinch roller means are positioned between the paper supply and exposure station and further comprising:

vacuum source means for supplying a vacuum force that does not significantly increase regardless of the amount of vacuum being obstructed; and a stationary vacuum platen positioned after the pinch roller means having a pair of spaced-apart guides defining a paper path along a print paper-engaging surface on a bottom side of the platen along the paper path, and having a plurality of vacuum ports located on the print paper-engaging surface in communication with the vacuum source means and disposed to support the print paper against the paper-engaging surface in a manner such that the leading edge of the print paper is held against the paper-engaging surface during advancement of the print paper without any other support.

2. The improvement of claim 1 wherein the spaced-apart guides include a pair of inwardly facing shoulders.

3. The improvement of claim 1 and further including a plurality of movable guides disposed within slots in the paper-engaging surface in a retracted position, said guides being movable downwardly beyond the paper-engaging surface to an extended position to define a plurality of predetermined paper paths for different widths of print paper and actuator means for selectively moving predetermined combinations of guides to the extended position.

4. The improvement of claim 3 wherein the movable guides are biased upwardly in the retracted position.

5. The improvement of claim 4 wherein the movable guides include first and second pin means extending through the platen and having upper portions for engagement by the actuator means and wherein the first pin means of each of the movable guides are located in a first row extending generally along the axis of the paper path and wherein the second pin means of each of the movable guides are positioned in a secondrow extending generally along the axis of the paper path and wherein the actuator means includes first and second actuators for selectively engaging predetermined first and second pin means, respectively.

6. The improvement of claim 5 wherein the first and second actuators each includes cam means having a rod portion disposed above each row of first and second pin means, said rod having cam sections positioned angularly about the circumference of the rod in a predetermined manner so that predetermined movable guide members are moved to the extended position when the rod portion is rotated and the cam sections engage predetermined first and second pin means.

7. A method of advancing print paper in a photographic printer, having a paper supply and a pinch roller assembly for moving the paper along a paper path, the method comprising:
   advancing the print paper through the pinch roller assembly to a paper-engaging surface of a vacuum platen having a plurality of vacuum ports;
   retaining a leading edge of the print paper along the paper-engaging surface with a relatively constant vacuum force regardless of the number of vacuum ports in the platen covered by the paper;
   indexing the paper to a reference point past an exposure station located on the paper-engaging surface; and
   indexing the leading edge of the photographic print paper back to a forward edge of the exposure station to minimize photographic print paper waste.

8. The method of claim 7 wherein the reference point is a knife assembly and the photographic print paper is trimmed with the knife assembly.

9. An improved paper advance apparatus for use in a photographic printer, for advancing photographic paper in a photographic printer, the printer including a housing, the apparatus comprising:
   a paper supply disposed within the housing;
   first pinch roller means for moving the paper along a paper path to an exposure station located after the first pinch roller means, said first pinch roller means positioned after the paper supply;
   referencing means for referencing a leading edge of the photographic print paper located downstream of the first pinch roller means;
   vacuum source means for supplying a relatively constant vacuum source regardless of the amount of vacuum being obstructed; and
   a stationary vacuum platen positioned within the housing after the first pinch roller means and having a pair of spaced-apart guides defining a paper path along a print paper-engaging surface on a bottom side fo the platen along the paper path, and having a plurality of vacuum ports located on the print paper-engaging surface communicating with the vacuum source means and disposed to support the print paper against the paper-engaging surface so that a leading edge of the print paper is retained against the paper-engaging surface without any further support during advancement of the paper leading edge.

10. The apparatus of claim 9 and further including second pinch roller means positioned within the housing between the vacuum platen and the reference means.

11. The apparatus of claim 9 wherein the spaced-apart guides include a pair of inwardly facing shoulders.

12. The apparatus of claim 9 and further including a plurality of movable guides disposed within slots in the paper-engaging surface in a retracted position, said guides being movable downwardly beyond the paper-engaging surface to an extended position to define a plurality of predetermined paper paths for different widths of print paper and actuator means for selectively moving predetermined combinations of guides to the extended position.

13. The apparatus of claim 12 wherein the movable guides are biased upwardly in the retracted position.

14. The apparatus of claim 13 wherein the movable guides include first and second pin means extending through the platen and having upper portions for engagement by the actuator means and wherein the first pin means of each of the movable guides are located in a first row extending generally along the axis of the paper path and wherein the second pin means of each of the movable guides are positioned in a second row extending generally along the axis of the paper path and wherein the actuator means includes first and second actuators for selectively engaging predetermined first and second pin means, respectively.

15. The apparatus of claim 14 wherein the first and second actuators each includes cam means having a rod portion disposed above each row of first and second pin means, said rod having cam sections positioned angularly about the circumference of the rod in a predetermined manner so that predetermined movable guide members are moved to the extended position when the rod portion is rotated and the cam sections engage predetermined first and second pin means.

16. The apparatus of claim 9 wherein the referencing means includes a knife assembly.

* * * * *